United States Patent [19]

Eppes

[11] Patent Number: 4,465,335

[45] Date of Patent: Aug. 14, 1984

[54] CONCENTRIC CORE OPTICAL FIBER COUPLER

[75] Inventor: Thomas A. Eppes, Carrollton, Tex.

[73] Assignee: The United States of America as represented by the Secretary of the Army, Washington, D.C.

[21] Appl. No.: 433,756

[22] Filed: Oct. 12, 1982

[51] Int. Cl.[3] .............................................. G02B 7/26
[52] U.S. Cl. .............................. 350/96.21; 350/96.15; 350/96.33
[58] Field of Search ................ 350/96.15, 96.21, 96.33

[56] References Cited

U.S. PATENT DOCUMENTS

| 4,008,061 | 2/1977 | Ramsay | 350/96.15 X |
| 4,252,403 | 2/1981 | Salisbury | 350/96.15 |
| 4,266,851 | 5/1981 | Salisbury | 350/96.15 |
| 4,314,740 | 2/1982 | Bickel | 350/96.15 |

FOREIGN PATENT DOCUMENTS

| 987774 | 4/1976 | Canada | 350/96.15 |
| 2704140 | 8/1978 | Fed. Rep. of Germany | 350/96.21 |
| 54913 | 4/1982 | Japan | 350/96.15 |

Primary Examiner—John D. Lee
Assistant Examiner—Frank González
Attorney, Agent, or Firm—Anthony T. Lane; Jeremiah G. Murray; Edward Goldberg

[57] ABSTRACT

A method for constructing and the resulting structural configuration of an input coupler for a concentric core optical fiber comprises removing the outer protective material of a concentric core optical fiber to expose the outer core back a predetermined distance from the end which includes the intermediate protective material or cladding and the inner core. A plurality of single core optical fibers are stripped so that their respective cores are exposed whereupon they are bonded to the exposed outer core by a transparent index matching epoxy, which bonding is located at the transition region where the exposed outer core begins and the outer cladding ends. The outer end of the concentric core fiber element including the intermediate protective material and the inner core is cleaved and at least one other single core optical element is cleaved and bonded in end to end abutting relationship with the inner core by transparent index matching epoxy. Additionally, opaque material is located on either side of the bonds to attenuate any optical energy not coupled between the cores.

21 Claims, 9 Drawing Figures

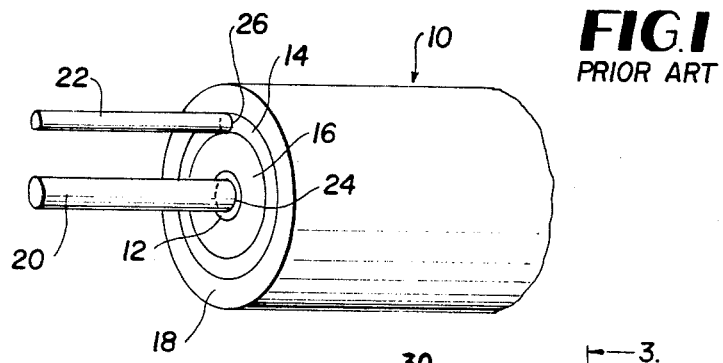
FIG.1 PRIOR ART
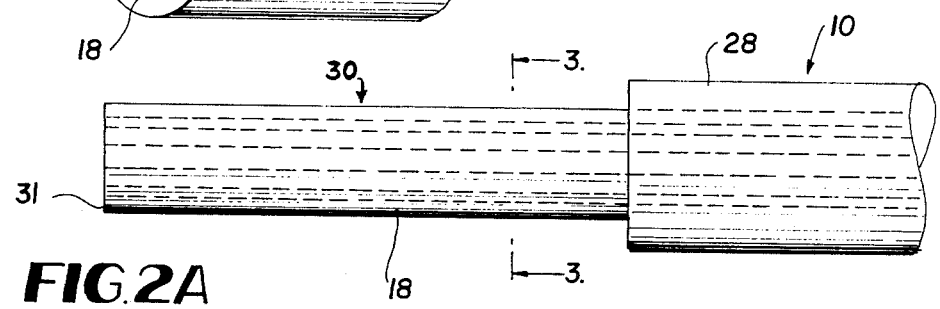
FIG.2A
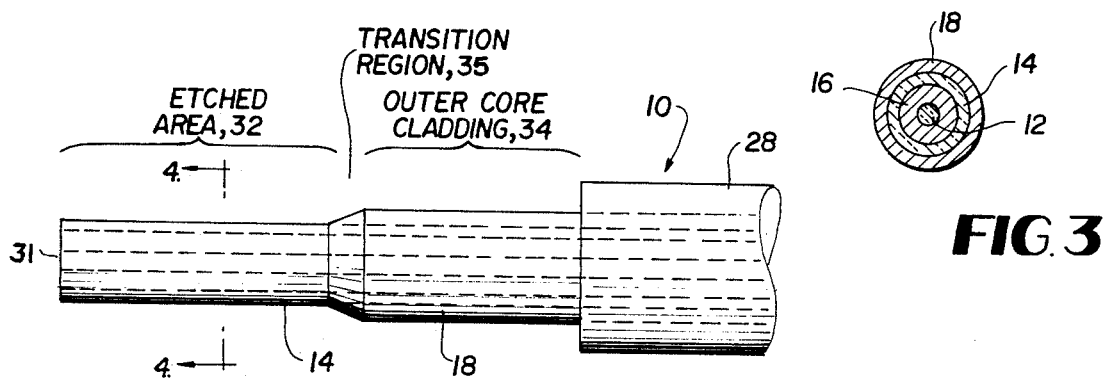
FIG.2B
FIG.3
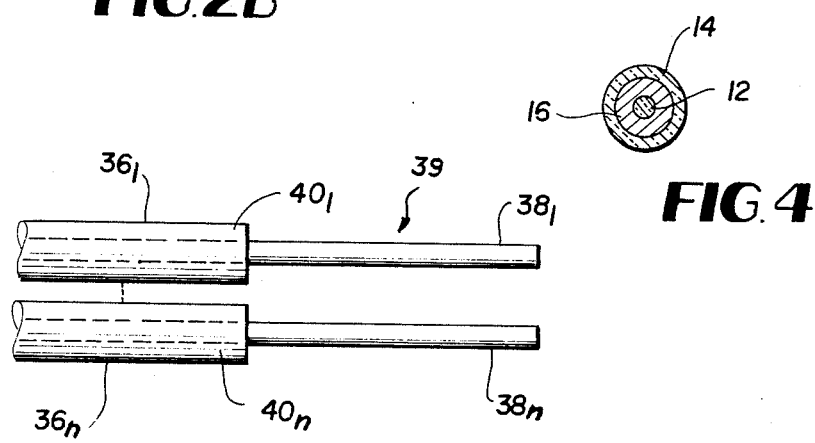
FIG.2C
FIG.4

CONCENTRIC CORE OPTICAL FIBER COUPLER

The Government has rights in this invention pursuant to Contract No. DAAB07-77-C-1818 awarded by the Department of the Army.

BACKGROUND OF THE INVENTION

This invention relates generally to fiber optics and more particularly to a coupler for coupling single core optical fibers to a concentric core optical fiber.

Fiber optics is currently finding wide application in communications equipment because of its ability to convey modulated light energy and due to the bandwidth considerations involved, a great deal of information can be transmitted on a relatively small size optical fiber. While single core optical fibers have conventionally been used, concentric core fibers have been shown to be potentially attractive for use in intrusion resistant communication links. As is well known, in concentric core optical fibers, two separate and distinct coaxial inner and outer light conducting cores exist, being separated from one another by cladding material so that optical power can be transmitted via the cores with minimal crosstalk and attenuation. For many intrusion resistant configurations, it becomes necessary to couple separate signals from separate light sources into the two cores independently. To do this requires an input coupler capable of low crosstalk and low insertion losses.

One known coupler for concentric core fibers comprises the use of two small step index fibers with core diameters equal to or less than the respective core thicknesses which are precisely aligned to the two concentric fiber cores and bonded into place by means of an epoxy. Although the crosstalk in such configuration is found to be within acceptable tolerance, considerable improvement is needed to improve the utility of the device in an intrusion resistant system. Although the insertion loss of such a device has been found to be tolerable, the small size of the input fibers, however, dictates that only a few microwatts of optical power can be coupled into either of the concentric core fibers. Additionally, large portions of the concentric cores, particularly the outer core, are not even illuminated and the capability of launching tens of microwatts from light emitting sources, such as diodes, is absent.

Accordingly, it is an object of the present invention to provide an improvement in optical fiber couplers.

Still another object of the present invention is to provide an improvement in concentric core optical fiber couplers which overcomes the limitation of crosstalk and input power capability.

These and other objects of the present invention are accomplished by the fabrication method and resulting structure wherein a plurality of single core input fibers are bonded to the outer core of a coaxial core optical fiber at a transition region where the outer core is exposed. The bonding is accomplished by transparent epoxy having an index of a fraction matching the cores. Also, opaque light absorbing material is also applied adjacent the location of bonding for absorbing extraneous optical power not coupled between the outer core and the plurality of single core input fibers. Additionally, at least one single core input fiber is aligned with the inner core of the concentric core fiber and bonded in end to end relationship therewith. Another region of opaque material is provided adjacent the location of the latter bonding to attenuate any excess power that is not launched into the inner core but may be ultimately coupled into the outer core and thus be a source of crosstalk.

BRIEF DESCRIPTION OF THE DRAWINGS

FIG. 1 is a diagram illustrative of a conventional prior art concentric core fiber optical input coupler;

FIGS. 2A through 2F are a set of diagrams illustrative of the fabrication sequence of a concentric core fiber optical input coupler in accordance with the subject invention;

FIG. 3 is a cross sectional view of FIG. 2A taken along the lines 3—3 thereof; and FIG. 4 is a cross sectional view of FIG. 2B taken along the lines 4—4 thereof.

DETAILED DESCRIPTION OF THE INVENTION

Figure 2D:
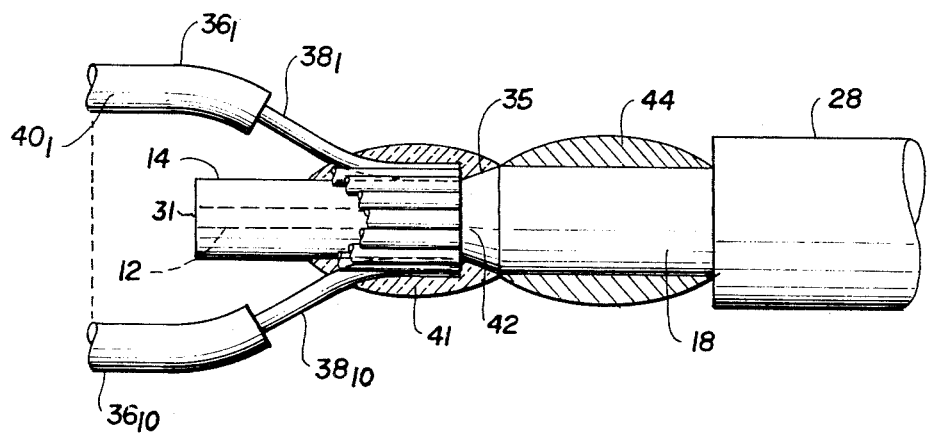

Referring now to the drawings and more particularly to FIG. 1, there is disclosed what is considered to be a conventional prior art concentric core fiber optic input coupler. As shown, reference numeral 10 denotes a concentric core optical fiber which is comprised of coaxial inner and outer cores 12 and 14 which are respectively adapted to conduct light energy applied thereto. The inner and outer cores are separated by an intermediate annular layer of cladding 16 for the inner core, while a second annular layer of cladding 18 is formed over the outer core 14. The concentric core fiber 10 is fabricated employing standard internal chemical vapor deposition (CVD) techniques. The cores 12 and 14 are typically comprised of germania doped silicon while the cladding layers 16 and 18 are comprised of boron doped silica. Although not shown, the concentric core fiber 10 may and usually does include a layer of plastic coating over the cladding layer 18. In order to couple energy into the concentric core fiber 10, one end of the fiber is cleaved to expose the inner and outer cores 12 and 14 whereupon two small step index single core fibers 20 and 22 also have their ends cleaved, whereupon they are precisely aligned and epoxied into place in abutting end to end relationship such as at the locations 24 and 26.

Referring now to a concentric core optical fiber coupler in accordance with the subject invention, reference to FIG. 2A is illustrative of the first step in fabricating an improved concentric core fiber input coupler and consists in taking a concentric core fiber 10 having a plastic coating 28 and stripping the plastic coating off for a predetermined length, such as 3 inches, from one end 30 to expose the outer core cladding 18. The end 30 is cleaved to provide a generally flat end surface 31 to expose both the inner and outer cores 12 and 14 as well as the inner core cladding 16 as shown in FIG. 3.

Next the outside cladding layer 18 is stripped to expose the outer core 14. This is shown in FIG. 2B where an area 32 of a length, for example 2 inches, at the far end 30 of the fiber is stripped, for example, by the use of a hydrofluoric acid solution with a controlled etch time. This will expose the outer core 14 while leaving a length 34 of outer core cladding visible with a transition region 35 therebetween. While the use of hydrofluoric acid comprises the preferred method of stripping the cladding 18, any number of mechanical means may be devised. In order to determine when the outer core 14 is reached during the etching step, however, it can be determined by transmitting visible optical power down the concentric core fiber from the opposite end, not shown. When the outer core is reached, a significant amount of power that is coupled in the outer core 14 will be noticeably scattered out into the etching solution.

Having exposed the length 32 of the outer core 14 as shown in FIG. 2B, a plurality of single core coupling fibers $36_1 \ldots 36_n$ are prepared for bonding to the exposed outer core 14 of the concentric core fiber 10. The input coupling fibers $36_1 \ldots 36_n$ are typically comprised of components having respective glass or silica cores $38_1 \ldots 38_n$ and plastic clad silica coatings $40_1 \ldots 40_n$. As shown in FIG. 2C, the coating is stripped from one end of the fibers $36_1 \ldots 36_n$ for a length 39, for example, of one inch. With removal of the plastic coating $40_1 \ldots 40_n$, the cores $38_1 \ldots 38_n$ are cleaned and cleaved. In the subject invention, a total number of six to ten fibers 36 are required.

Assuming a number of ten, once the ten plastic clad silica fibers $36_1 \ldots 36_{10}$ are prepared, they are epoxy bonded around the periphery of the outer core 14 at the transition region 35 as shown in FIG. 2D providing epoxy region 41 at about one inch, for example, from the end of the plastic coating 28 of the concentric core fiber as well as the ends of the respective coatings $40_1 \ldots 40_{10}$ of the single core fibers $36_1 \ldots 36_{10}$. Choice of the epoxy compound to bond the cores $38_1 \ldots 38_{10}$ to the outer core 14 is critical because it must be optically clear and have an index of refraction which closely matches that of the core materials, otherwise a significant amount of optical power will be lost which may inadvertently be coupled to the inner core 12. The space between the epoxy region 41 and the plastic coating 28 of the concentric core fiber and consisting of the outer cladding 18 is next covered with an opaque stripping compound as indicated by reference numeral 44 for absorbing extraneous optical power that is not coupled into the outer core 14 from the single core fibers bonded thereto and coupled to sources of optical power, not shown.

Figure 2E:
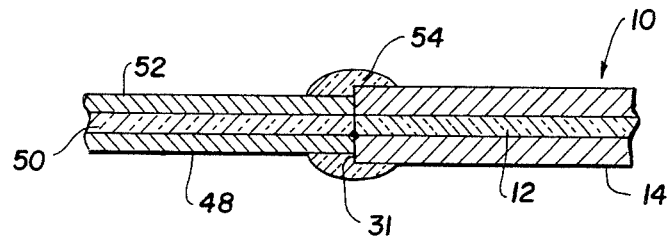

Next a single core fiber 48, as shown in FIG. 2E, is stripped, cleaned and cleaved so that it can be attached to the inner core 12 at the end 31 of the concentric core fiber 10. The fiber 48, for example, comprises a step index input fiber having a light conducting core 50 covered by a coating 52. The core 50 is precisely aligned in end to end abutting relationship with the inner core 12 where it is bonded thereto by a transparent epoxy compound at a region shown by reference numeral 54. Again the epoxy compound is adapted to match the refractive index of the two cores 12 and 50. In aligning the core 50 to the inner core 12 prior to the epoxy bonding step, a micropositioner and a microscope can be utilized in conjunction with a source of visible optical power such as a laser. Light from the laser when coupled to the opposite end of one of the fibers is used to facilitate the alignment and positioning so that maximum coupling efficiency will be realized. As noted, the input fiber 48 comprises a step index fiber. The choice of this fiber is extremely important because it must have a numerical aperture which closely matches that of the inner core 12 of the concentric core fiber 10. Mismatching the numerical aperture can lead to extraneous optical power being inadvertently coupled into the outer core 14 and cause crosstalk. The diameter of the core 50 of the input fiber 58 should also be compatible and nearly equal to the core diameter of the inner core 12.

An alternative to coupling to the inner core 12 is to take a plurality, e.g. ten or twenty fibers 48 and simply cleave and epoxy all of them to the end 31 of the concentric core fiber. By transmitting light down the opposite end of the concentric core fiber, one can observe which one or two fibers the light is coupling into from the concentric core fiber. These one or two fibers will turn out to have been accidentally aligned with the inner core 12 of the concentric core fiber. The others are then removed. This approach, while being extremely simple and requiring little or no micropositioning, suffers from an inherent limitation that coupling efficiency is likely to be degraded as a result of this random positioning technique.

Figure 2F:
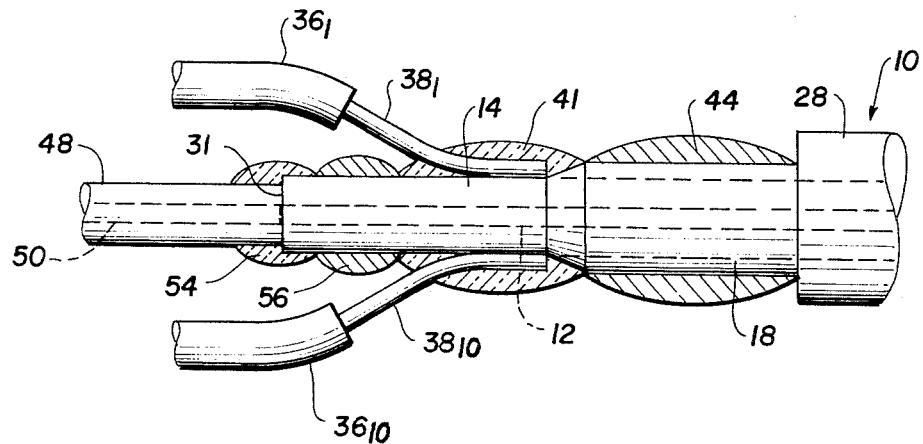

The components thus bonded together and as shown in FIG. 2F further include a light absorptive region 56 wherein a black or opaque stripping compound is placed on the outside of the outer core 14 between the epoxy regions 41 and 54. The purpose of this absorptive compound is to attenuate any optical power that is not coupled into the inner core 12 from the input fiber 48. Again the purpose of this is to minimize one source of crosstalk between the inner and outer cores 12 and 14 of the concentric core fiber.

The concentric core optical coupler is now complete with the exception that it is also desirable at this point to encapsulate it in some compound, not shown, but of a conventional type, which will give it physical durability and prevent breakage of the delicate exposed fibers. Additionally, the end of all the fibers, whether they be the concentric core or single core fibers, are terminated with some type of optical connector to facilitate connection to other elements in an optical system utilizing the construction of the subject invention.

Having thus shown and described what is at present considered to be the preferred method of fabrication and the resulting structure thereof, it should be noted that the foregoing has been made by way of illustration and not limitation and accordingly all modifications, alterations and changes coming within the spirit and scope of the invention as set forth in the appended claims are herein meant to be included.

I claim:

1. A fiber optical coupler, comprising in combination:
    a concentric core optical fiber element having coaxial inner and outer light conducting cores separated by intermediate cladding material and having external cladding material over said outer core;
    a region of said concentric core optical element where said external cladding material is removed exposing a predetermined length of said outer core;
    at least one single core optical fiber element having a light conducting core and external cladding covering said core;
    a region of said at least one single core element where said respective external cladding is removed exposing a predetermined length of said single core, said length of said single core thus exposed being bonded to and optically matched to the length of said exposed outer core of said concentric core element; and
    at least one other single core optical fiber element having a single light conducting core and external cladding and wherein the end of said respective single core has a numerical aperture substantially equal to and bonded to said inner core of said concentric core element.

2. The optical coupler as defined by claim 1 wherein the end of said single core of said at least one other optical fiber element is bonded in end to end abutting relationship with the end of said inner core of said concentric core element.

3. The coupler as defined by claim 2 wherein said at least one other single core optical fiber element and said inner core and intermediate cladding material of said concentric core element are respectively cleaved to provide substantially flat end surfaces which are bonded together by an optically matched bonding compound.

4. The fiber optical coupler as defined by claim 1 wherein said exposed length of said outer core is located at one end of said concentric core optical fiber element and additionally including a transition region between the exposed outer core and the external cladding material and wherein the single core of said at least one single core optical fiber element is bonded to said outer core in relatively close proximity to said transition region.

5. The fiber optical coupler as defined by claim 4 wherein said at least one single core optical fiber element comprises a plurality of single core optical fiber elements each having a single light conducting core and external cladding covering said each respective core, and wherein each of said plurality of single core optical fiber elements have respective regions where the respective external cladding is removed exposing a respective predetermined length of each single core, and wherein each core is bonded and optically matched to the length of said outer core of said concentric core element adjacent said transition region.

6. The optical fiber coupler as defined by claim 5 wherein said plurality of single cores are bonded to said outer core of said concentric core element by means of a substantially transparent epoxy compound which is optically matched to the cores bonded to said outer core thereby.

7. The fiber optical coupler as defined by claim 6 and additionally including an opaque material on said external cladding material adjacent the bonded cores for absorbing extraneous optical energy not coupled between the outer core and the respective cores of said plurality of single core fiber elements.

8. The fiber optical coupler as defined by claim 7 wherein said at least one other single core optical fiber element is bonded in end to end abutting relationship with said inner core at the end of said inner core, said end of said inner core being spaced apart from transition region where the plurality of single cores are bonded to said outer core.

9. The optical coupler as defined by claim 8 and additionally including opaque material located on said intermediate cladding material intermediate the bond between said outer core and said plurality of single cores of said plurality of single core elements bonded thereto and the bond between said at least one other single core optical fiber element and said inner core.

10. The optical coupler as defined by claim 9 and wherein said concentric core optical fiber element additionally includes a plastic outer coating over said external cladding and wherein said plastic coating is removed for exposing a predetermined length of said external cladding which is greater than said predetermined length of said exposed outer core.

11. The optical coupler as defined by claim 10 wherein said at least one other single core optical fiber bonded in end to end abutting relationship with said inner core comprises a plurality of single core optical fiber elements cleaved and bonded in end to end relationship with said inner core.

12. A method for coupling at least one single core optical fiber to each core of a dual concentric core optical fiber having coaxial inner and outer cores separated by intermediate cladding and including external cladding and a plastic coating over the outer core, comprising the steps of:

removing the plastic coating for a first length at one end of the concentric core optical fiber and exposing the external cladding;

removing the external cladding for a second and smaller length relative to said first length to expose the outer core of said concentric core optical fiber;

exposing the core of at least one single core fiber;

positioning and bonding said core of said single core fiber against the exposed outer core with an index matching bonding agent at a predetermined point back from said end of said concentric core fiber;

applying opaque material adjacent the location of bonding for absorbing extraneous optical power not coupled between the outer core and said core of at least one single core fiber;

exposing the core of at least one other single core fiber having a numerical aperture substantially matching that of the inner core of said concentric core optical fiber;

positioning and bonding the core of said at least one other single core fiber in end to end relationship with the inner core and wherein said bonding is effected with an index matching agent; and applying opaque material between the location of the inner core bond and the outer core bond for absorbing extraneous optical power not coupled between the core of said at least one other single core fiber and the inner core.

13. The method as defined by claim 12 wherein said steps of bonding with an index matching bonding agent comprises bonding with an epoxy compound which is substantially optically clear.

14. The method as defined by claim 12 wherein said steps of applying an opaque material comprises applying a substantially black stripping compound.

15. The method as defined by claim 12 and additionally including the step of encapsulating the cores thus bonded together in a predetermined type of encapsulating material for providing a structure having physical durability and which prevents breakage of the exposed fibers.

16. The method as defined by claim 12 wherein said step of exposing the core of at least one single core fiber comprises the step of exposing the respective cores of a plurality of single core fibers, and wherein said step of positioning and bonding against the exposed outer core comprises the step of positioning and bonding the cores of said plurality of single core fibers around the outer surface of said exposed outer core.

17. The method as defined by claim 16 wherein said plurality of single core fibers are comprised of single core fibers having outer cladding material and additionally including the step of removing said outer cladding material of said plurality of fibers for exposing predetermined lengths of the respective cores prior to positioning and bonding said cores against the exposed outer surface of the outer core of said concentric core fiber.

18. The method as defined by claim 12 wherein said step of positioning and bonding the core of at least one other single core fiber to the inner core comprises cleaving said at least one other single core fiber and the inner core to provide a substantially flat cleaved surface whereby said surfaces are abutted together and bonded.

19. The method as defined by claim 12 wherein said step of positioning and bonding the core of at least one other single core fiber in end to end relationship with said inner core comprises the additional step of precisely aligning the core ends in mutually abutting relationship.

20. The method of claim 12 wherein said step of positioning and bonding the core of at least one other single core fiber in end to end relationship with said inner core comprises the step of cleaving a plurality of other single core fibers and said inner core and bonding the cleaved ends of said plurality of other single core fibers to the cleaved end of said inner core.

21. The method as defined by claim 12 wherein said step of positioning and bonding the core of at least one other single core fiber and said inner core comprises the additional step of aligning and abutting the ends of said cores followed by bonding their mutual ends together with a transparent epoxy compound.

* * * * *